United States Patent [19]

Tyrell et al.

[11] Patent Number: 4,576,982
[45] Date of Patent: Mar. 18, 1986

[54] HYDROLYTICALLY STABILIZED POLYCARBONATES

[75] Inventors: John A. Tyrell; Gary L. Freimiller, both of Mt. Vernon, Ind.

[73] Assignee: General Motors Company, Mt. Vernon, Ind.

[21] Appl. No.: 650,427

[22] Filed: Sep. 14, 1984

[51] Int. Cl.$^4$ ............................................. C08L 69/00
[52] U.S. Cl. ...................................... 524/84; 524/108; 524/111; 524/601; 524/604; 524/611
[58] Field of Search ................ 524/84, 108, 111, 611; 528/196

[56] References Cited

U.S. PATENT DOCUMENTS 3,028,365 4/1962 Schnell et al. ...................... 528/196
3,989,672 11/1976 Vestergaard .......................... 528/196

Primary Examiner—Harold D. Anderson
Attorney, Agent, or Firm—Myron B. Kapustij; Martin B. Barancik

[57] ABSTRACT

Thermoplastic composition exhibiting improved hydrolytic stability comprised of in physical admixture at least one aromatic carbonate polymer and an effective hydrolytic stabilizing amount of at least one compound represented by the general formula

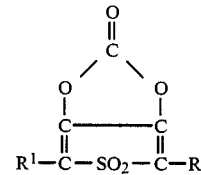

wherein R and R$^1$ are independently selected from hydrogen, monovalent hydrocarbon radicals, and monovalent hydrocarbonoxy radicals.

26 Claims, No Drawings

HYDROLYTICALLY STABILIZED POLYCARBONATES

BACKGROUND OF THE INVENTION

Polycarbonates are well known thermoplastic polymers which, due to their many advantageous physical and mechanical propertes, are utilized as thermoplastic engineering materials. These polycarbonates exhibit many advantageous properties such as, for example, toughness, impact strength, flexibility, and optical clarity.

However, the polycarbonates are generally somewhat susceptible to hydrolytic degradation. It has long been known that various compounds, such as the epoxides, stabilize polycarbonates against hydrolytic degradation. While many chemicals are effective hydrolytic stabilizers for polycarbonates, not all of these compounds are practical. This is due to the fact that in order for a compound to be of practical use as a hydrolytic stabilizer not only must it be effective in stabilizing polycarbonates against hydrolytic degradation, but it must also not significantly deleteriously affect the advantageous physical and mechanical properties of the polycarbonate.

It is, therefore, an object of the instant invention to provide a new class of hydrolytic stabilizers for polycarbonates.

SUMMARY OF THE INVENTION

In accordance with the instant invention there is provided a polycarbonate composition exhibiting improved hydrolytic stability comprised of, in physical admixture, at least one aromatic polycarbonate resin and an effective amount of a hydrolytically stabilizing compound represented by the general formula $$\begin{array}{c} O \\ \| \\ C \\ / \ \ \backslash \\ O \ \ \ \ O \\ | \ \ \ \ \ | \\ C\text{———}C \\ \| \ \ \ \ \ \| \\ R^1-C-SO_2-C-R \end{array}$$

wherein R and $R^1$ are independently selected from hydrogen, monovalent hydrocarbon radicals, and monovalent hydrocarbonoxy radicals.

DETAILED DESCRIPTION OF THE INVENTION

It has been discovered that polycarbonate compositions exhibiting improved hydrolytic stability can be provided by admixing with a high molecular weight aromatic polycarbonate resin a hydrolytic stabilizer selected from compounds represented by the general formula $$\begin{array}{c} O \\ \| \\ C \\ / \ \ \backslash \\ O \ \ \ \ O \\ | \ \ \ \ \ | \\ C\text{———}C \\ \| \ \ \ \ \ \| \\ R^1-C-SO_2-C-R \end{array} \quad \text{I.}$$

wherein R and $R^1$ are independently selected from hydrogen, monovalent hydrocarbon radicals, and monovalent hydrocarbonoxy radicals. The monovalent hydrocarbon radicals represented by R and $R^1$ include the alkyl radicals, the cycloalkyl radicals, the aryl radicals, the aralkyl radicals, and the alkaryl radicals.

The alkyl radicals include the straight chain and the branched alkyl radicals. The preferred alkyl radicals are those containing from 1 to about 12 carbon atoms. Some illustrative non-limiting examples of these alkyl radicals include methyl, ethyl, propyl, isopropyl, butyl, tertiarybutyl, pentyl, neopentyl, hexyl, heptyl, nonyl, and decyl.

The preferred cycloalkyl radicals are those containing from 4 to about 8 ring carbon atoms. Some illustrative non-limiting examples of these cycloalkyl radicals include cyclobutyl, cyclopentyl, cyclohexyl, methylcyclohexyl, and cycloheptyl.

The aryl radicals represented by R and $R^1$ include the unsubstituted aryl radicals and the substituted, preferably the alkyl substituted, aryl radicals. The preferred aryl radicals are those containing from 6 to 12 ring carbon atoms. The unsubstituted aryl radicals containing from 6 to 12 ring carbon atoms include phenyl, biphenyl, and naphthyl. The substituted aryl radicals containing from 6 to 12 ring carbon atoms include the substituted, preferably alkyl substituted phenyl, the substituted, preferably alkyl substituated biphenyl, and the substituted, preferably alkyl substituted, naphthyl.

The preferred aralkyl and alkaryl radicals are those containing from 7 to about 14 carbon atoms.

Some illustrative non-limiting examples of the hydrolytic stabilizers of Formula I are set forth in Table. I

TABLE I

| R | $R^1$ |
|---|---|
| —CH₃ | —CH₃ |
| —C₂H₅ | —C₂H₅ |
| —CH₂—CH(CH₃)—CH₃ | —CH₃ |
| 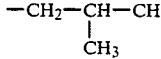 |  |
|  (2,4-di-CH₃ phenyl) | 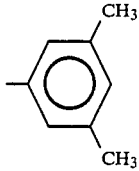 (2,4-di-CH₃ phenyl) |
| —H | —C₃H₇ |
| —CH₃ | 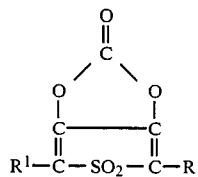 |
| 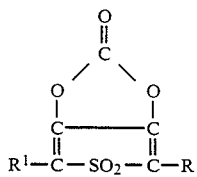 |  |

TABLE I-continued

| R | R¹ |
|---|---|
| 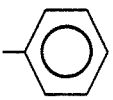 | 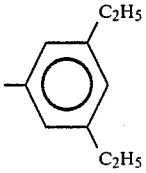 |
| 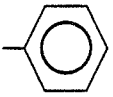 |  |

The preferred compounds of Formula I are those wherein R and R¹ are independently selected from monovalent hydrocarbon radicals. The preferred monovalent hydrocarbon radicals represented by R and R¹ are the aryl radicals. That is to say, the more preferred compounds of Formula I are those wherein R and R¹ are independently selected from aryl radicals, i.e., the unsubstituted aryl radicals and the substituted, preferably alkyl substituted, aryl radicals. The most preferred compounds of Formula I are those wherein R and R¹ are independently selected from phenyl radicals.

The preferred aryl radicals represented by R and R¹ may be represented by the general formula

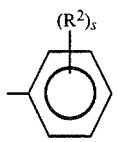 II.

wherein $R^2$ is independently selected from alkyl radicals and s is a positive integer having a value of from 0 to 4 inclusive.

Preferred alkyl radicals represented by $R^2$ are those containing from 1 to about 6 carbon atoms. These include straight chain alkyl radicals and the branched alkyl radicals. Some non-limiting illustrative examples of these preferred alkyl radicals include methyl, ethyl, propyl, isopropyl, butyl, tertiarybutyl, pentyl neopentyl, hexyl, and the positional isomers of hexyl.

The amount of the compound of Formula I present in the instant thermoplastic compositions is an amount effective to improve the hydrolytic stability of these compositions, i.e., an effective amount. Generally, this amount is in the range of from about 0.005 to about 5 weight percent, based on the amount of carbonate polymer present in the compositions, and preferably from about 0.05 to about 1.0 weight percent. Generally, if less than about 0.005 weight percent of at least one compound of Formula I is present there will be no appreciable improvement in the hydrolytic stability of the composition. The upper limit of the amount of the compound of Formula I present is governed by the fact that it be such that it does not cause significant deterioration of the physical and mechanical properties of the carbonate polymer. Thus, the instant compositions contain an amount of at least one compound of Formula I which is effective to improve the hydrolytic stability thereof but insufficient to significantly deleteriously affect the advantageous properties thereof.

It is important that the additive of Formula I remains physically present during the processing of the polymer. Although the boiling point of the additive may be lower than the processing temperature of the polymer, the bulk of the additive may stay with the polymer during processing because of its intermingling with the polymer below the surface of the flowing material, It is important that the quantity of the additive present in the polymer during and after, and particularly after, thermal processing produces a hydrolytic stabilizing effect.

The compounds of Formula I are added to the preformed polymer and thoroughly physically admixed therewith to form an intimate physical mixture of at least one compound of Formula I and the polymer. The compounds of Formula I may be added to the polymer in a conventional manner, for example by co-extruding with the dry resin or by adding the additive of this invention to the solution or melt of the polymer.

It is, of course, possible to utilize mixtures of two or more different compounds of Formula 1 as well as individual additives of the instant invention.

The high molecular weight aromatic thermoplastic carbonate polymers of the instant invention include the polycarbonates and the so-called copolyestercarbonates. The polycarbonates are well known compounds which are described, along with methods for their preparation, inter alia, in U.S. Pat. Nos. 3,989,672, 3,275,601, 3,028,365, and in Schnell, H., *Chemistry and Physics of Polycarbonates,* Interscience Publishers, New York, New York, 1964. The polycarbonates contain at least one recurring structural unit represented by the general formula

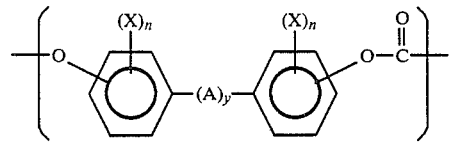

wherein:

X is independently selected from monovalent hydrocarbon radicals, halogen radicals, and monovalent hydrocarbonoxy radicals;

A is a divalent hydrocarbon radical, —O—, —S—S—,

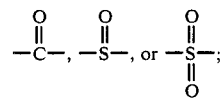

y is either zero or one; and n is independently selected from positive integers having a value of from 0 to 4 inclusive.

The monovalent hydrocarbon radicals represented by X include the alkyl radicals, both the branched and the straight chain alkyl radicals, the cycloalkyl radicals, the aryl radicals, both the unsubtituted and the substituted, preferably the alkyl substituted, aryl radicals, the aralkyl radicals, and the alkaryl radicals.

The preferred alkyl radicals are those containing from 1 to about 12 carbon atoms. The cycloalkyl radicals are preferably those containing from 4 to 8 ring carbon atoms. The preferred aryl radicals are those containing from 6 to 12 ring carbon atoms.

The preferred aralkyl and alkaryl radicals are those containing from 7 to about 14 carbon atoms.

The monovalent hydrocarbonoxy radicals represented by X, as well as those represented by R and $R^1$, may be represented by the general formula —OR' wherein R' is a monovalent hydrocarbon radical of the type described hereinafore. Preferably, for R and $R^1$, R' is an aryl radical or an alkaryl radical.

The divalent hydrocarbon radicals represented by A include the alkylene radicals, the alkylidene radicals, the cycloalkylene radicals, and the cycloalkylidene radicals. Preferred alkylene radicals are those containing from 2 to about 15 carbon atoms. The preferred alkylidene radicals are those containing from 1 to about 15 carbon atoms. The preferred cycloalkylene radicals and cycloalkylidene radicals are those containing from 4 to about 16 ring carbon atoms.

These polycarbonates may be conveniently prepared by a number of conventional processes such as, for example, melt polymerization, interfacial condensation, and interesterification.

One convenient process for the preparation of the instant polycarbonates is the interfacial polymerization process. In this process a dihydric phenol is reacted with a carbonate precursor in the presence of a catalyst, an acid acceptor, and a chain terminator. The dihydric phenols employed are known dihydric phenols in which the sole reactive groups are the two phenolic hydroxyl groups. Some of these dihydric phenols may be represented by the general formula

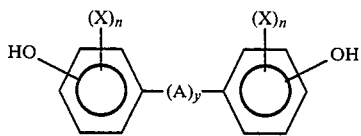

wherein X, A, n and y are as defined hereinafore.

Some illustrative non-limiting examples of suitable dihydric phenols include:
2,2-bis(4-hydroxyphenyl)propane (bisphenol-A);
1,1-bis(4-hydroxyphenyl)-1-phenyl-ethane:
1,1-bis(4-hydroxyphenyl)-1,1-diphenyl methane:
1,1-bis(4-hydroxyphenyl)cyclohexane;
2,2-bis(3-propyl-4-hydroxyphenyl)decane;
2,2-bis(4-hydroxyphenyl)pentane;
2,2-bis(4-hydroxyphenyl)hexane
2,2-bis(3-ethyl-4-hydroxyphenyl)propane:
2,2-bis(3,5-dibromo-4-hydroxyphenyl)propane
2,2-bis(3,5-dimethyl-4-hydroxyphenyl)propane;
p,p'-dihydroxydiphenyl;
3,3'-dimethyl-4,4'-dihydroxydiphenyl:
bis(3-chloro-5-methyl-4-hydroxyphenyl)ether;
bis(3-methyl-4-hydroxyphenyl sulfone;
4,4'-thiodiphenol;
bis(3-methyl-4-hydroxyphenyl)sulfoxide; and
bis(4-hydroxyphenyl)sulfoxide.

A further group of dihydric phenols outside the scope of the aforedisclosed generic forumla which may be used in the practice of the instant invention includes the dihydroxy benzenes and the halo- and alkyl substituted dihydroxy benzenes such as, for example, resorcinol, hydroquinone, 1,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimethylbenzene, and 1,4-dihydroxy-2-bromo-3-propylbenzene.

Other dihydric phenols of interest include the phthalein type bisphenols which are disclosed in U.S. Pat. Nos. 3,035,012, 3,036,036, 3,036,037, 3,036,038 and 3,036,039.

It is, of course, possible to employ mixtures of two or more different dihydric phenols in preparing the thermoplastic polycarbonates of the instant invention as well as individual dihydric phenols.

The carbonate precursors employed in the preparation of the high molecular weight aromatic polycarbonates of the instant invention include the carbonyl halides, the bishaloformates, and the diarylcarbonates. The carbonyl halides which may be employed include carbonyl bromide, carbonyl chloride, and mixtures thereof. The preferred carbonyl halide is carbonyl chloride, also known as phosgene. Typical of the diarylcarbonates which may be employed are diphenyl carbonate; di(halophenyl)carbonates such as di(chlorophenyl)carbonate, di(bromophenyl)carbonate, di(trichlorophenyl) carbonate, di(tribromophenyl)carbonate, and the like; di(alkylphenyl)carbonates such as di(tolyl)carbonate, and the like; di(naphthyl)carbonate, di(chloronaphthyl)carbonate, phenyl tolyl carbonate, chlorophenyl chloronaphthyl carbonate, and the like; or mixtures thereof. The bishaloformates suitable for use herein include the bishaloformates of dihydric phenols such as the bischloroformate of hydroquinone, bischloroformates of bisphenol-A, and the like; the bishaloformates of glycols such as, for example, bischloroformate of ethylene glycol, bischloroformate of neopentyl glycol, bischloroformate of polyethylene glycol, and the like.

Also included within the scope of the instant invention are the high molecular weight randomly branched aromatic polycarbonates. These randomly branched thermoplastic polycarbonates are well known in the art and may be conveniently prepared by reacting a minor amount of at least one polyfunctional organic compound with the aforedescribed carbonate precursor and dihydric phenol. Some of the polyfunctional organic compounds useful in the preparation of these randomly branched polycarbonates are disclosed, inter alia, in U.S. Pat. Nos. 3,635,895, 4,001,184, 3,525,712, 3,816,373, 4,204,047 and 4,294,953.

These polyfunctional organic compounds are generally aromatic in nature and contain at least three functional groups which may be hydroxyl, carboxyl, carboxylic anhydride, haloformyl, and mixtures thereof. Some illustrative non-limiting examples of these polyfunctional organic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, and the like.

In formulating the compositions of the instant invention it is possible to employ physical mixtures, i.e., blends, of two or more different polycarbonates, copolyester-carbonates, or blends of at least one polycarbonate and at least one copolyester-carbonate. Thus, for example, the instant compositions may contain mixtures of two or more different linear polycarbonates, at least one linear polycarbonate and at least one randomly branched polycarbonate, two or more different branched polycarbonates, at least one polycarbonate and at least one copolyester-carbonate, or two different copolyester-carbonates.

The copolyester-carbonates of the instant invention are well known compounds which are described, along with methods for their preparation, in U.S. Pat. Nos.

3,169,121 and 4,156,069, both of which are hereby incorporated herein by reference.

Briefly stated, the high molecular weight aromatic copolyester-carbonates of this invention comprise recurring carbonate groups, carboxylate groups, and aromatic carbocyclic groups in the linear polymer chain, in which at least some of the carboxylate groups and at least some of the carbonate groups are bonded directly to the ring carbon atoms of the aromatic carbocyclic groups.

These copolyester-carbonates contain ester bonds and carbonate bonds in the polymer chain, wherein the amount of ester bonds, relative to the carbonate bonds, is from about 25 to about 90 mole percent, and preferably from about 35 to about 80 mole percent. For example, 5 moles of bisphenol-A reacting completely with 4 moles of isophthloyl dichloride and 1 mole of phosgene would give a copolyester-carbonate of 80 mole percent ester bonds.

The copolyester-carbonates may be prepared by any of the conventional and well known methods such as, for example, interfacial polymerization, melt polymerization, transesterification, and the like. The copolyester-carbonates may be conveniently prepared via the interfacial polymerization process by reacting (i) at least one difunctional carboxylic acid or, preferably, an ester forming reactive derivative thereof, (ii) at least one dihydric phenol, and (iii) a carbonate precursor.

The dihydric phenols useful in the preparation of the instant copolyester-carbonates are the same as those described hereinafore for the preparation of the polycarbonates. Likewise, the carbonate precursors utilized in the preparation of the instant copolyester-carbonates are the same as those described hereinafore for the preparation of the polycarbonates of this invnetion.

The difunctional carboxylic acids which may be utilized in the preparation of the copolyestercarbonates generally conform to the formula

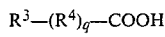

wherein $R^4$ is an alkylene, alkylidene, aralkylene, aralkylidene or cycloaliphatic group; an aromatic group such as phenylene, substituted phenylene, preferably alkyl substituted phenylene, naphthylene, substituted naphthylene, preferably alkyl substituted naphthylene, biphenylene, substituted biphenylene, preferably alkyl substituted biphenylene, and the like; two or more aromatic groups connected through non-aromatic linkages such as alkylene or alkylidene groups; and the like. $R^3$ is either a carboxyl or a hydroxyl group. The letter q represents one where $R^3$ is a hydroxyl group and either zero or one where $R^3$ is a carboxyl group.

Preferred difunctional carboxylic acids are the aromatic carboxylic acids, i.e. those acids of the afordescribed generic formula wherein q is one, $R^3$ is a carboxyl or hydroxyl group, and $R^4$ is an aromatic group such as phenylene, substituted phenylene, naphthylene, substituted naphthylene, biphenylene, substituted biphenylene, and the like. The preferred aromatic carboxylic acids are those represented by the general formula

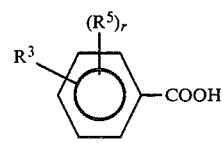

wherein:
$R^3$ is as defined hereinafore;
$R^5$ is independently selected from halogen radicals and monovalent hydrocarbon radicals; and
r is a positive integer having a value of from 0 to 4 inclusive.

The monovalent hydrocarbon radicals are those as defined for X herinafore.

Mixtures of two or more of these difunctional carboxylic acids may be employed, and where the term difunctional carboxylic acid is employed herein it is to be understood that this term encompasses mixtures of two or more different difunctional carboxylic acids as well as individual difunctional carboxylic acids.

Particularly useful difunctional carboxylic acids are terephthalic acid, isophthalic acid, and mixtures thereof.

Rather than utilizing the difunctional carboxylic acids per se it is preferred to utilize the ester forming reactive derivatives of these acids. Particularly useful ester forming reactive derivatives of these acids are the acid dihalides. The preferred acid dihalides are the acid dichlorides. Thus, for example, instead of using the aforementioned terephthalic acid, isophthalic acid, or mixtures thereof, it is preferred to use terephthaloyl dichloride, isophthaloyl dichloride, or mixtures thereof.

The thermoplastic compositions of the instant invention may optionally contain the commonly known and used additives such as, for example, antioxidants; antistatic agents; inert fillers such as talc, clay, mica, glass, and the like; colorants; ultraviolet radiation absorbers such as the benzophenones, benzotriazoles, and cyanoacrylates; color stabilizers such as the organophosphites disclosed in U.S. Pat. Nos. 3,305,520 and 4,118,370; and flame retardants.

Some particularly useful flame retardants are the alkali and alkaline earth metal salts of sulfonic acids. These types of flame retardants are disclosed, inter alia, in U.S. Pat. Nos. 3,933,734, 3,931,100, 3,978,024, 3,948,851, 3,926,908, 3,919,167, 3, 909,490, 3,953,396, 3,953,399, 3,917,559 and 3,940,366, all of which are hereby incorporated by reference.

DESCRIPTION OF THE PREFERRED EMBODIMENT

The following examples are set forth to further illustrate the present invention and are not to be construed as limiting the invention thereto. Unless otherwise indicated, all parts and percentages are parts and percentages by weight.

The following examples illustrate a conventional polycarbonate falling outside the scope of the instant invention in that it does not contain any hydrolytic stabilizer. These examples are presented for comparative purposes only.

EXAMPLE 1

1500 grams of a conventional bisphenol-A polycarbonate were extruded at 500° F. The material had an Intrinsic Viscosity in methylene chloride at 25° C. of 0.49 dl/gm and a KI of 3610.

The KI (Kasha Index) is related to the Intrinsic Viscosity of the resin. Generally, the lower the KI the lower the Intrinsic Viscosity and the greater the melt flow of the resin. Basically, the KI is a measurement of the melt viscosity of the resin. The procedure for determining the KI is as follows: 7 grams of resin pellets, dried a minimum of 90 minutes at 125° C. are added to a modified Tinius-Olsen T3 melt indexer; the temperature in the indexer is maintained at 300° C. and the resin is heated at this temperature for six minutes; after six minutes the resin is forced through a 0.04125 inch radius orifice using a plunger of 0.1865 inch radius and an applied force of 17.7 pounds; the time required for the plunger to travel 2 inches is measured in centiseconds and this is reported as the KI (Kasha Index). The higher the KI the higher the Intrinsic Viscosity of the resin. Conversely, the lower the KI the lower the Intrinsic Viscosity of the resin.

EXAMPLE 2

The extruded polycarbonate resin of Example 1 was autoclaved for 18 hours at 250° F. and 15 psig steam pressure. After autoclaving the KI of the resin was determined to be 1740.

The following examples illustrate the hydrolytically stabilized polycarbonate compositions of the instant invention.

EXAMPLE 3

A mixture containing 1500 grams of the same bisphenol-A polycarbonate as used in Example 1 and 8 grams of 4,6-diphenylthieno[3,4-d][1,3]dioxol-2-one 5,5-dioxide was extruded at 500° F. The material had an Intrinsic Viscosity in methylene chloride at 25° C. of 0.49 dl/gm and a KI of 3650.

EXAMPLE 4

The extruded mixture of Example 3 was autoclaed for 18 hours at 250° F. and 15 psig steam pressure. After autoclaing the KI of the resin composition was determined to be 2490.

TABLE II

| Example No. | KI | Δ KI |
|---|---|---|
| 1 | 3610 | |
| 2 | 1740 | 1870 |
| 3 | 3650 | |
| 4 | 2490 | 1160 |

As illustrated by the data in Table II the change in the KI (ΔKI) between Examples 1 and 2 is greater than the change in KI between Examples 3 and 4. This shows that there was less hydrolytic degradation of the composition of Example 3 than of the unstabilized resin of Example 1. Thus, the stabilized compositions of the instant invention exhibit improved hydrolytic stability relative to conventional unstabilized polycarbonates.

The instant compositions are useful in the preparation of molded articles, films, and the like.

It is, of course, apparent to those skilled in the art that changes may be made in the particlular embodiments of the invention described which are within the full intended scope of the invention as defined by the appended claims.

What is claimed is:

1. A thermoplastic composition exhibiting improved hydrolytic stability comprising, in physical admixture:
   (i) at least one aromatic carbonate polymer; and
   (ii) a hydrolytic stabilizing effective amount of at least one compound represented by the general formula

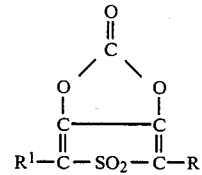

wherein R and R¹ are independently selected from hydrogen, monovalent hydrocarbon radicals, or monovalent hydrocarbonoxy radicals.

2. The composition of claim 1 wherein said monovalent hydrocarbon radicals are selected from alkyl radicals, cyclalolkyl radicals, aryl radicals, aralkyl radicals, or alkaryl radicals.

3. The composition of claim 2 wherein said monovalent hydrocarbon radicals are selected from aryl radicals or alkaryl radicals.

4. The composition of claim 1 wherein said monoavlent hydrocarbonoxy radicals are represented by the general formula —OR' wherein R' is selected from monovalent hydrocarbon radicals.

5. The composition of claim 4 wherein said monovalent hydrocarbon radicals are selected from alkyl radicals, cycloalkyl radicals, aryl radicals, aralkyl radicals, or alkaryl radicals.

6. The composition of claim 5 wherein said monovalent hydrocarbon radicals are selected from aryl radicals or alkaryl radicals.

7. The composition of claim 1 wherein R and R¹ are independently selected from monovalent hydrocarbon radicals.

8. The composition of claim 7 wherein said monovalent hydrocarbon radicals are selected from alkyl radicals, cycloalkyl radicals, aryl radicals, aralkyl radicals, or alkaryl radicals.

9. The composition of claim 8 wherein said monovalent hydrocarbon radicals are selected from aryl radicals or alkaryl radicals.

10. The composition of claim 9 wherein R and R¹ are phenyl.

11. The composition of claim 1 wherein said hydrolytic stabilizing compound is present in an amount of from about 0.005 to about 5 weight percent, based on the amount of said carbonate polymer present.

12. The composition of claim 11 wherein said hydrolytic stabilizing compound is present in an amount of from about 0.01 to about 0.5 weight percent, based on the amount of carbonate polymer present.

13. The composition of claim 11 wherein said carbonate polymer is a polycarbonate.

14. The composition of claim 13 wherein said polycarbonate is derived from at least one dihydric phenol and a carbonate precursor.

15. The composition of claim 14 wherein said carbonate precursor is phosgene.

16. The composition of claim 15 wherein said dihydric phenol is bisphenol-A.

17. The composition of claim 11 wherein said carbonate polymer is a copolyester-carbonate.

18. The composition of claim 17 wherein said copolyester-carbonate is derived from at least one dihydric phenol, at least one difunctional carboxylic acid or a ester forming reactive derivative thereof, and a carbonate precursor.

19. The composition of claim 18 wherein said difunctional carboxylic acid is selected from terephthalic acid, isophthalic acid, or mixtures thereof.

20. The composition of claim 18 wherein said ester forming reactive derivative of said difunctional carboxylic acid is selected from isophthaloyl dichloride, terephthaloyl dichloride, or mixtures thereof.

21. The composition of claim 20 wherein said dihydric phenol is bisphenol-A.

22. The composition of claim 21 wherein said carbonate precursor is phosgene.

23. The composition of claim 1 which contains a flame retardant amount of at least one flame retardant agent.

24. The composition of claim 23 wherein said flame retardant is selected from the alkali or alkaline earth metals of organic sulfonic acids.

25. The composition of claim 1 which contains a filling amount of an inert filler.

26. The composition of claim 25 wherein said filler is a mineral filler.

* * * * *

UNITED STATES PATENT AND TRADEMARK OFFICE
CERTIFICATE OF CORRECTION

PATENT NO. : 4,576,982
DATED : March 18, 1986
INVENTOR(S) : John A. Tyrell and Gary L. Freimiller It is certified that error appears in the above-identified patent and that said Letters Patent is hereby corrected as shown below:

Title page:

Assignee should be "General Electric Company"

Signed and Sealed this

Twenty-third Day of February, 1988

*Attest:*

DONALD J. QUIGG

*Attesting Officer*   *Commissioner of Patents and Trademarks*